United States Patent [19]

Hartvigsen et al.

[11] Patent Number: 4,888,688
[45] Date of Patent: Dec. 19, 1989

[54] DYNAMIC DISABLE MECHANISM FOR A MEMORY MANAGEMENT UNIT

[75] Inventors: Jay A. Hartvigsen, Austin; William C. Moyer, Dripping Springs, both of Tex.

[73] Assignee: Motorola, Inc., Schaumburg, Ill.

[21] Appl. No.: 98,244

[22] Filed: Sep. 18, 1987

[51] Int. Cl.4 .................. G06F 12/00; G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,736,290 | 4/1988 | McCallion | 364/200 |
| 4,737,909 | 4/1988 | Harada | 364/200 |
| 4,740,889 | 4/1988 | Motersole et al. | 364/200 |
| 4,763,244 | 8/1988 | Moyer et al. | 364/200 |
| 4,774,652 | 9/1988 | Dhuey et al. | 364/200 |

Primary Examiner—Gareth D. Shaw
Assistant Examiner—Viet Nguyen
Attorney, Agent, or Firm—Jeffrey V. Myers

[57] ABSTRACT

In a data processing system comprising a central processing unit (CPU), a memory management unit (MMU) and a storage system, the MMU translates each of the logical addresses output by the CPU to a corresponding physical address in the storage system by selectively using translation descriptors stored in an address translation cache. In response to receiving a dynamic disable signal, the MMU will provide each logical address as the corresponding physical address without translation. In addition, the MMU will preserve the state of the entries in the address translation cache, and "freeze" the translation activities.

6 Claims, 1 Drawing Sheet

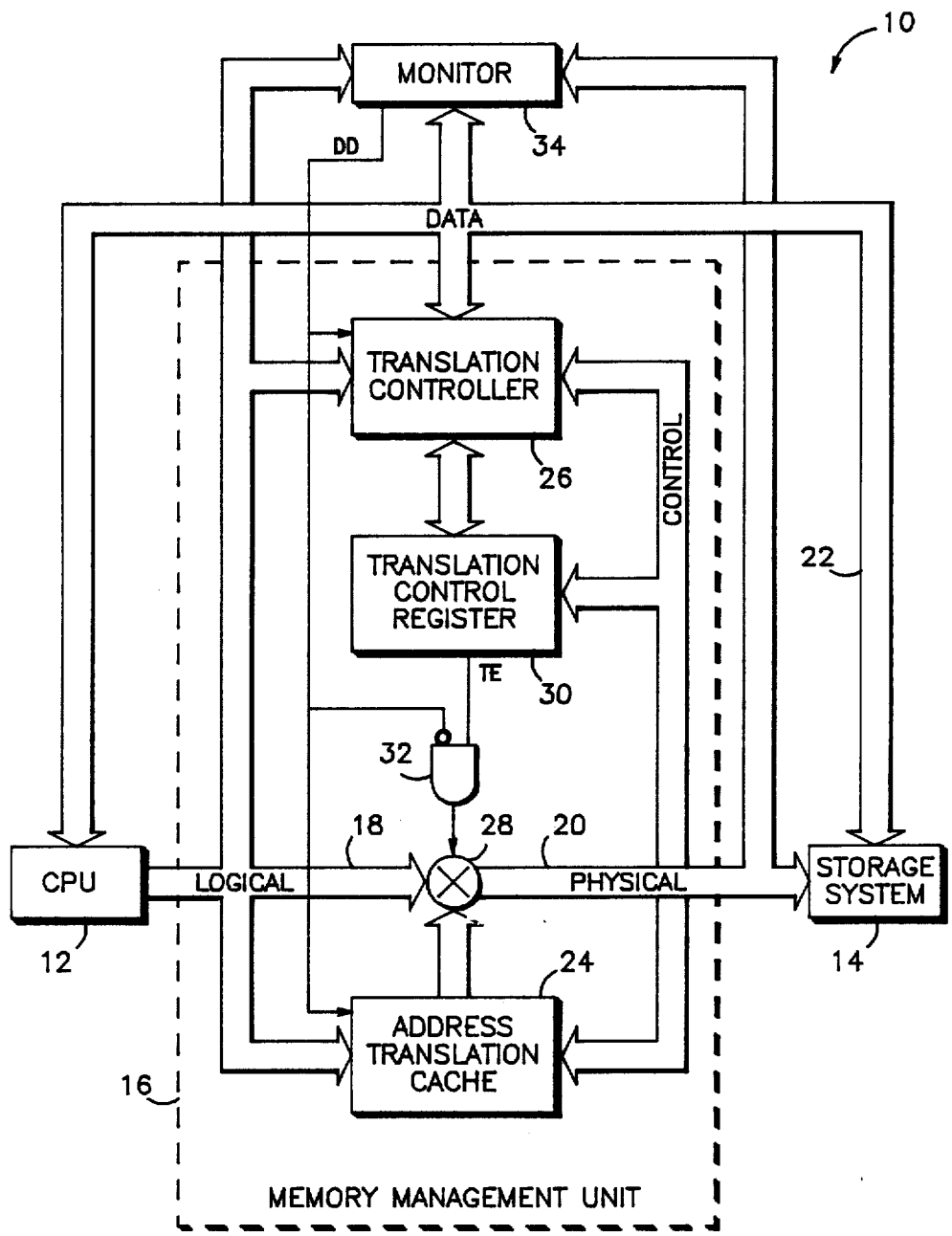

DYNAMIC DISABLE MECHANISM FOR A MEMORY MANAGEMENT UNIT

FIELD OF THE INVENTION

The subject invention relates generally to memory management units and, more particularly, to a method and apparatus for dynamically disabling a memory management unit from translating logical addresses into respective physical addresses.

BACKGROUND ART

In data processing systems having virtual memory capabilities, a memory management unit (MMU) is provided to translate each "logical" address in virtual memory as it is output by the data processor to a respective "physical" address in real memory. In general, upon initiation of system operation, the MMU is in a non-translation mode so that each logical address is provided as the respective physical address without translation. After the operating system has initialized all appropriate logical-to-physical address translation information in the MMU or in memory, as the case may be, the MMU can be put into the normal translation mode. Thereafter, the MMU will translate all logical addresses output by the processor to the respective physical addresses according to the translation information established by the operating system.

In some systems, the MMU can be selectively enabled and disabled by means of a control bit in a register within the MMU, which can be set or reset by the processor. For example, in at least one prior art system, the MC68851 Paged Memory Management Unit (PMMU), commercially available from Motorola, Inc., the state of an Enable bit in a Translation Control register, directly writable (and readable) by the associated processor, controls the translation mechanism. When "set", translation is enabled; when "clear", translation is disabled.

In systems used for emulation or software/hardware development, the operation of the data processing system may be monitored by an independent controller to verify proper system operation. In such systems, it is often difficult to observe certain system events, such as cache activities. Accordingly, in some systems, the cache can be dynamically disabled by the monitoring controller as required. An example of such a dynamic cache disabling mechanism is described in U.S. Pat. No. 4,740,889 issued to David S. Mothersole et al. on Apr. 26, 1988, and assigned to Motorola, Inc.

During emulation, the monitoring activities of the emulation software executing within the processor may affect the state of the MMU such that the performance of the software under test is not as it would have been absent those effects. For example, execution of the emulation software will modify the state of the "use" information used to select translation descriptors for replacement, so that when execution of the test software is resumed, the replacement algorithm will not perform the same as when only the test software has been executing. Even if the MMU is capable of being selectively disabled from the processor, sufficient translation activities still occur while the disabling code is being executed. What is needed is a mechanism for dynamically disabling the MMU independent of the processor.

SUMMARY OF THE INVENTION

Accordingly, it is an object of the present invention to provide a dynamic disable mechanism which allows the translation activities of the MMU to be dynamically disabled.

This and other objects are achieved in a data processing system comprising: a memory for storing a plurality of instructions at respective physical addresses; a processor for executing the instructions, the processor requesting the instructions using logical addresses; a memory management unit (MMU) for selectively translating the logical addresses to respective physical addresses; and MMU disable logic for disabling the MMU in response to the first disable signal provided by the processor. In accordance with the present invention, additional logic is provided in the MMU disable logic for receiving a second MMU disable signal from a source external to said data processing system, and for disabling the MMU in response thereto.

BRIEF DESCRIPTION OF THE DRAWING

The sole FIGURE illustrates in block diagram form, a data processing system constructed in accordance with the present invention.

DESCRIPTION OF THE INVENTION

Shown in the FIGURE is a virtual memory type of data processing system 10 comprising a central processing unit (CPU) 12, a storage system 14 and a memory management unit (MMU) 16. In general, supervisor and user programs are stored in the storage system 14, which typically comprises high speed memory and slower speed peripherals such as disks, at respective physical addresses. During operation, the CPU 12 references the instructions and data operands comprising these programs using respective logical addresses. The MMU 16 receives the logical addresses output by the CPU 12 via a logical address bus 18, translates these logical addresses to the corresponding physical addresses using logical-to-physical address translation descriptors stored either within the MMU 16 or within the storage system 14, and forwards the resultant physical addresses to the storage system 14 via a physical address bus 20. In response to receiving each physical address, the storage system 14 allows the CPU 12 to access a respective storage location within the storage system 14 via a data bus 22.

Within the MMU 16, an address translation cache (ATC) 24 is provided to temporarily store a selected subset of the translation descriptors so that many, if not most, of the logical addresses output by the CPU 12 can be rapidly translated to the corresponding physical addresses. A translation controller 26 is provided to find any translation descriptor not resident in the ATC 24 by "walking" a set of translation tables stored in the storage system 14. If the ATC 24 is full, one of the resident translation descriptors, preferrably the least recently used, will be discarded to make room in the ATC 24 for the new translation descriptor. Once translated, the resultant physical address is gated onto the physical address bus 20 via a bus switch 28.

In the preferred form of the MMU 16, a Translation Control register (TCR) 30 is provided to store a Translation Enable (TE) bit (not shown), which selectively enables the MMU 16 to translate logical addresses to the respective physical addresses. The "state" of the TE bit in the TC register 30 is applied to the control input of the bus switch 28 via an AND gate 32. In normal operation, if the TE bit is "set", bus switch 28 will decouple the logical address bus 18 from the physical address bus 20, and allow the ATC 24 to drive the physical address bus 20. On the other hand, if the TE bit is "clear", bus switch 28 will couple the logical address bus 18 directly to the physical address bus 20, thereby bypassing the ATC 24.

In the preferred embodiment shown in FIG. 1, a monitor 34 is provided to monitor the processing activities of the data processing system 10. When appropriate, the monitor 34 may provide a dynamic disable (DD) signal to disable the MMU 16 from translating the logical addresses to the respective physical addresses. In response to the DD signal, received via an inverting input thereof, the AND gate 32 will force the bus switch 28 to couple the logical address bus 18 directly to the physical address bus 20. The DD signal is also applied to the ATC 24 and to the translation controller 26 to preserve the state of the entries in the ATC 24 and to "freeze" the translation activities.

Although the present invention has been described herein in the context of a preferred embodiment, alternate embodiments may be made without departing from the spirit and scope of the present invention. For example, in systems in which the MMU is not controlled using a mechanism such as the TC register 30, the DD signal may be applied directly to the Bus Switch 28. In any event, however, the present invention may be used to significant advantage to provide dynamic control of the logical-to-physical address translation process.

We claim:

1. A data processing system, comprising:
   a memory for storing a plurality of instructions at respective physical addresses;
   a processor for executing the instructions, the processor requesting the instructions using logical addresses;
   means coupled to the memory and processor for external monitoring, by a user, of processing activities of the system;
   a memory management unit (MMU) for selectively translating the logical addresses to respective physical addresses, said MMU being selectively disabled by the processor to inhibit said translating wherein said MMU outputs logical addresses as physical addresses;
   the improvement comprising:
   MMU address translation disable means provided in the MMU, said address translation disable means disabling the MMU from performing address translations in response to either a translation enable signal originating from the processor or in response to a dynamic disable signal provided by the means for monitoring; and
   control means provided in the MMU and coupled to the processor and memory, said control means selectively reading translation information required by the MMU, but not resident in the MMU, and residing in the memory, and replacing predetermined translation information in the MMU with the required translation information.

2. The data processing system of claim 1 wherein said MMU further comprises:
   storage means in the MMU for selectively translating received logical addresses to physical addresses in the memory, said storage means preserving all current MMU state information in the storage means while the MMU is disabled by said dynamic disable signal.

3. In a data processing system, wherein a monitor is used in conjunction with said data processing system to externally monitor, by a user, processing activities comprising:
   a memory for storing a plurality of instructions at respective physical addresses;
   a processor for executing the instructions, the processor requesting the instructions using logical addresses;
   a memory management unit (MMU) for selectively translating the logical addresses to respective physical addresses having MMU translation disable means, responsive to a translation enable signal originating in the processor, for disabling the MMU in response to the translation enable signal provided by the processor;
   a method for controlling translation operation of the MMU comprising the steps of:
   receiving with a logic means, both a dynamic disable signal from said monitor and the translation enable signal from the processor; and
   disabling the MMU from translating logical addresses into physical addresses in response to either the dynamic disable signal received by the logic means or the translation enable signal.

4. The method of claim 3 further comprising the step of:
   preserving all current MMU state information while the MMU translation operation is disabled in response to the dynamic disable signal.

5. A data processor for use in a data processing system having a memory for storing a plurality of instructions at respective physical addresses, wherein a monitor is used by an external user in conjunction with said data processing system to monitor processing activities, the data processing system comprising:
   a processor for executing the instructions, the processor requesting the instructions by using logical addresses;
   a memory management unit (MMU) for selectively translating the logical addresses to respective physical addresses in the memory; and
   MMU address translation disable means in the MMU for receiving both a translation enable signal, originating in the processor,
   and a dynamic disable signal from said monitor for disabling address translation activity of the MMU in response to either said translation enable signal or said dynamic disable signal.

6. The data processing system of claim 5 wherein the MMU further comprises:
   storage means in the MMU coupled to the processor and memory for providing a predetermined physical address in response to a predetermined logical address and for preserving all current MMU state information while the MMU is disabled by said dynamic disable signal.

* * * * *